(12) United States Patent
Whitney et al.

(10) Patent No.: US 8,900,095 B2
(45) Date of Patent: Dec. 2, 2014

(54) AUTOMATIC TRANSMISSION SYNCHRONOUS GEAR SHIFT

(71) Applicant: GM Global Technology Operations LLC, Detroit, MI (US)

(72) Inventors: Christopher E. Whitney, Commerce, MI (US); Christopher Harold Knieper, Chesaning, MI (US); Ronald W. Van Diepen, Ann Arbor, MI (US); Ning Jin, Novi, MI (US); Matthew D. Whitton, Howell, MI (US)

(73) Assignee: GM Global Technology Operations LLC, Detroit, MI (US)

(*) Notice: Subject to any disclaimer, the term of this patent is extended or adjusted under 35 U.S.C. 154(b) by 108 days.

(21) Appl. No.: 13/742,722

(22) Filed: Jan. 16, 2013

(65) Prior Publication Data

US 2013/0310219 A1 Nov. 21, 2013

Related U.S. Application Data

(60) Provisional application No. 61/649,529, filed on May 21, 2012.

(51) Int. Cl.
| | |
|---|---|
| *B60W 10/02* | (2006.01) |
| *B60W 10/06* | (2006.01) |
| *B60W 10/10* | (2012.01) |
| *B60W 10/113* | (2012.01) |
| *F16H 61/688* | (2006.01) |
| *B60W 30/19* | (2012.01) |
| *B60W 10/11* | (2012.01) |
| *F16H 59/02* | (2006.01) |

(52) U.S. Cl.
CPC ....... *B60W 10/11* (2013.01); *B60W 2710/0644* (2013.01); *F16H 2306/14* (2013.01); *B60W 10/113* (2013.01); *F16H 61/688* (2013.01); *B60W 30/19* (2013.01); *F16H 2059/0252* (2013.01); *B60W 2710/0666* (2013.01); *B60W 10/02* (2013.01); *B60W 10/06* (2013.01)
USPC .............................................. 477/77; 477/109

(58) Field of Classification Search
USPC .................................................... 477/77, 109
See application file for complete search history.

(56) References Cited

U.S. PATENT DOCUMENTS

| | | | | |
|---|---|---|---|---|
| 6,616,574 | B2* | 9/2003 | Jeon .............................. | 477/109 |
| 6,658,339 | B1* | 12/2003 | Wright et al. ................... | 701/53 |
| 7,252,621 | B2* | 8/2007 | Tanba et al. .................... | 477/77 |
| 7,691,029 | B2* | 4/2010 | Guggolz et al. ............... | 477/174 |

* cited by examiner

*Primary Examiner* — Edwin A Young
(74) *Attorney, Agent, or Firm* — Quinn Law Group, PLLC

(57) ABSTRACT

A method of commanding a synchronous gear shift begins by receiving a request to shift from a third gear to a first gear, and skipping a second gear having a gear ratio between the gear ratio of the first gear and the gear ratio of the third gear. Subsequently the method includes: reducing a torque command to a predetermined value; opening a clutch disposed on the input shaft of the transmission to decouple the transmission from the engine; transitioning the engine from a torque-control mode into a speed-control mode; commanding the engine to rotate at a speed dictated by the motion of the vehicle and the gear ratio of the first gear; closing the clutch to couple the transmission and the engine; and transitioning the engine back into the torque-control mode.

17 Claims, 7 Drawing Sheets

AUTOMATIC TRANSMISSION SYNCHRONOUS GEAR SHIFT

CROSS REFERENCE TO RELATED APPLICATIONS

This application claims the benefit of U.S. Provisional Application No. 61/649,529, filed May 21, 2012, which is hereby incorporated by reference in its entirety.

TECHNICAL FIELD

The present invention relates generally to torque control methodologies to accomplish a synchronous gear shift in a vehicle having an engine and transmission coupled to the engine through an input clutch.

BACKGROUND

Modern vehicles are frequently equipped with multi-speed, dual-clutch transmissions (DCT) as part of the subject vehicle's powertrain. Such DCTs are favored for their increased mechanical efficiency in comparison with typical, torque-converter equipped automatic transmissions. Additionally, DCTs are often preferred over typical automated manual transmissions for the capability of DCTs to provide higher quality gear shifts.

A typical DCT employs two friction clutches for shifting among its forward ratios, and accomplishes such shifts by alternating engagement between one and the other of the two friction clutches. Such a multi-speed, dual-clutch transmission may be utilized in a hybrid vehicle, i.e., a vehicle employing two or more distinct power sources, such as an engine and an electric motor, for transmitting propulsion energy to the subject vehicle's driven wheels.

SUMMARY

A method of commanding a synchronous gear shift begins by receiving a request to shift from a third gear to a first gear, and skipping a second gear having a gear ratio between the gear ratio of the first gear and the gear ratio of the third gear. As may be appreciated, the first, second and third gears may be any gears within an automatic transmission gear-train, such that they are distinct gears. The method may further include: reducing a torque command to a predetermined value; opening a clutch disposed on the input shaft of the transmission to decouple the transmission from the engine; transitioning the engine from a torque-control mode into a speed-control mode; commanding the engine to rotate at a speed dictated by the motion of the vehicle and the gear ratio of the first gear; closing the clutch to couple the transmission and the engine; and transitioning the engine back into the torque-control mode.

In one configuration reducing a torque command to a predetermined value may include reducing the engine torque via an immediate torque request. The immediate torque request may effectuate a modification to at least one of a spark timing and an amount of fuel supplied to a cylinder. During such control, the torque command and the engine rotation speed may be independently controllable through the adjustment of a spark timing, a fuel supply, and further through a modification of an airflow supply.

The torque command may be configured to saturate at an immediate torque maximum during the speed-control mode. The immediate torque maximum may likewise include a maximum amount of torque that is capable of being produced by an engine at a fixed airflow (i.e. via the immediate torque request).

Prior to the closing of the clutch to couple the transmission and the engine, the torque command may approach zero to ensure a smooth transition. Additionally, while in the speed-control mode the engine controller may disregard any axle torque request provided by the driver. Once the shift sequence is complete, the controller may gradually transition the engine back into the torque-control mode over a period of time. As may be appreciated, the torque command may largely be a function of a driver acceleration request when the engine is in a torque-control mode The above features and advantages and other features and advantages of the present invention are readily apparent from the following detailed description of the best modes for carrying out the invention when taken in connection with the accompanying drawings.

DETAILED DESCRIPTION

Figure 1:
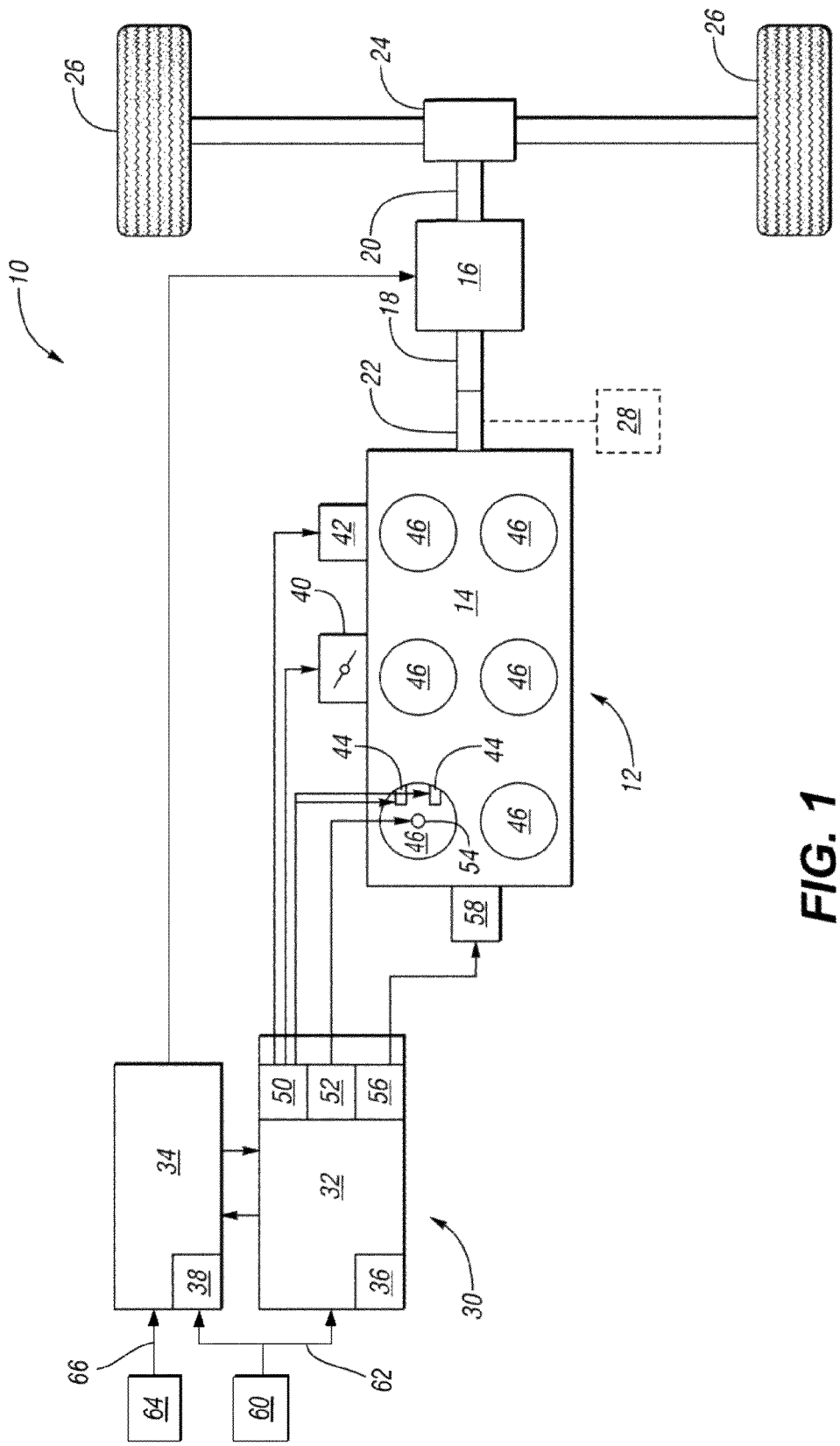
FIG. 1 is a schematic diagram of a vehicle powertrain in communication with an engine control module and a transmission control module.

Referring to the drawings, wherein like reference numbers refer to like components throughout the several views, FIG. 1 shows a vehicle 10 having a powertrain 12 that includes an engine 14 and a transmission 16. The engine 14 is a spark-ignited internal combustion engine. In another embodiment, the engine 14 may be a diesel engine without the spark actuation discussed herein. The transmission 16 may be an automatic transmission having a plurality of intermeshing gears and selectively engageable clutches that establish different speed ratios between a transmission input member 18 and a transmission output member 20. A crankshaft 22 of the engine 14 is connectable for rotation with the transmission input member 18 to provide torque from the input member 18 to the output member 20 at a gear ratio established by the transmission 16. Torque from the output member 20 is provided through a final drive mechanism 24 to vehicle wheels 26. In some embodiments, the vehicle 10 may be a hybrid vehicle having one or more electric motor/generators. For example, a motor/generator 28 may be connected with the crankshaft 22 by a belt and pulley arrangement or otherwise, and controllable to provide torque to increase torque at the crankshaft 22 or to decrease torque at the crankshaft 22, such as when operated as a generator in a regenerative braking mode.

The vehicle 10 has a control system 30 that includes at least an engine control module (ECM) 32 and a transmission control module (TCM) 34. The ECM 32 may be referred to as a first controller and the TCM 34 may be referred to as a second controller. The ECM 32 and TCM 34 are operatively connected with one another to coordinate control of the engine 14 and the transmission 16. Alternatively, the ECM 32 and the TCM 34 may be configured as a single powertrain control module having the functionality of both the ECM 32 and the TCM 34.

As will be described further below, the ECM 32 and TCM 34 may be configured to operate together to control the smooth operation of the vehicle powertrain. For example, the TCM 34 may communicate with the ECM 32 to coordinate the shifting of gears within the transmission 16 by temporarily reducing the torque on the crankshaft 22 (i.e., crankshaft torque) during the shift. Likewise, the TCM 34 may be configured to limit the maximum torque provided by the engine to protect the transmission components.

The ECM 32 includes a processor 36 configured to control engine functions. For example, the processor 36 may have a stored algorithm that determines torque commanded at the crankshaft 22 by the ECM 32 based on vehicle operating conditions, driver input and, as described herein, requests from the TCM 34 for torque management prior to and during transmission shifts. As further described below the algorithm may also determine different torque capacities at the crankshaft 22 that are available when different torque actuators are controlled to be at different states. As used herein, a "torque actuator" is a system that varies an engine parameter to affect crankshaft torque. Some of the torque actuators that may be controllable by the ECM 32 to modify torque at the crankshaft 22 include, for example, an airflow actuator or actuator module 50 that controls airflow to engine cylinders 46, a spark actuator or actuator module 52 that controls spark ignition timing, and a fuel actuator or actuator module 56 that controls fuel to the engine cylinders 46.

The TCM 34 may likewise include a processor 38 with an algorithm that is operable to control the timing and duration of transmission shifts. The TCM processor 38 may also be configured to determine a range of torque reduction at the crankshaft 22 to be requested of the ECM 32 during a shift of the transmission 16, such as an upshift. The range of torque reduction requested is based at least in part on the torque capacities determined by the ECM 32.

A request for torque or an amount of torque reduction or removal of torque reduction via control of spark, fuel or electric motor/generator is referred to as an immediate torque request or a request for immediate torque, while a request for torque or an amount of torque reduction due to control of airflow is referred to as a predicted torque request or a request for predicted torque. Changes to spark timing and changes to fuel delivery, such as fuel shutoff (also referred to as fuel cut), occur relatively quickly in comparison to a change to airflow. Airflow is therefore referred to as a relatively slow torque actuator, while spark timing and fuel shutoff are referred to as relatively fast torque actuators.

The airflow actuator provided by the engine 14 affects the torque at the crankshaft 22 due to control of airflow through the throttle 40, such as by opening or closing the throttle 40 to a greater or lesser degree, control of airflow through turboboosters or superchargers 42 to affect air pressure in the engine 14, and control of airflow through cam phasers 44 that control the timing of inlet valves and exhaust valves for engine cylinders 46. The airflow actuator may be part of the airflow actuator module 50 that sends actuation signals to the throttle 40, the turbobooster and/or supercharger 42 and the phasers 44. Control of torque by changes to airflow has an inherent delay between actuation or implementation of an airflow torque request and the effect of the request on crankshaft torque. Therefore, such a request is referred to as a predicted request as it is for an effect on crankshaft torque that is predicted to occur after some delay after the actuation occurs. For example, a change in throttle position will not have a full effect on crankshaft torque until air currently in the manifold and cylinders 46 is pushed through the engine 14. The response in time of crankshaft torque to a predicted torque request can vary based on many factors because of the nature of airflow control. One such factor is engine speed. Performing shifts with a predicted and immediate torque reduction can provide more overall reduction than with immediate torque reduction alone. However, more coordination of the timing of the torque requests may be necessary due to the nature of the response to predicted torque requests on gas spark-ignited engines.

The spark actuator may be a part of the spark actuation module 52 that sends actuation signals to control the timing of the spark generated by spark plugs 54 (one shown) relative to top dead center (TDC) of the pistons within the cylinders 46. For a given engine combustion mixture there is an optimum spark timing that is a function of engine speed, the amount of combustible air in the mixture, charge temperature and other factors. Timing the spark later than this optimum spark timing is referred to as spark reduction as it causes the combustion within the cylinder 46 to produce less torque at the crankshaft 22.

The fuel actuator may be part of a fuel actuation module 56 that sends actuation signals to control fuel flow such as through a fuel injector 58 for each of the cylinders 46 (one shown). When the fuel torque actuation signal is for fuel shutoff to occur, no combustion takes place in the cylinders 46 and crankshaft torque is significantly reduced.

Axle torque provided at the transmission output member 20 is determined based partially on a operator-requested axle torque and on torque intervention requests received from other vehicle systems, with the torque intervention requests being subject to limitations imposed by the TCM 34 and ECM 32 that controls and largely prevents propulsion in a direction of motion opposite the intended direction of motion and also prevents excessive deceleration of the vehicle 10. The operator may be a driver, in which case the operator-requested axle torque is the axle torque desired by the driver. In one configuration, the control algorithms performed by the TCM 34 and/or ECM 32 may be based on either desired crankshaft torque or the axle torque.

A driver-operated accelerator device 60 such as an accelerator pedal is operable to provide a driver-requested axle torque signal 62 to the ECM 32. The driver-requested axle torque signal 62 may be an electrical signal representative of the position of the accelerator device 60 which can be correlated with a driver-requested axle torque at the transmission output member 20. The axle torque request is the sum of the torque at all axles. In an all wheel-drive application, a 400 Nm request may be achieved with 200 Nm on both axles or 300 Nm on one axle and 100 Nm on the other axle.

A driver-operated braking device 64 such as a brake pedal is operable to provide a driver-requested braking torque signal 66 to the TCM 34. The driver-requested braking torque signal 66 is representative of the position of the braking device 64 which can be correlated with a driver-requested braking torque applied via a brake system applied to one or more of the vehicle wheels 26. Braking torque is axle torque in a direction opposite to the driver-requested axle torque associated with the accelerator device 60.

Figure 2:
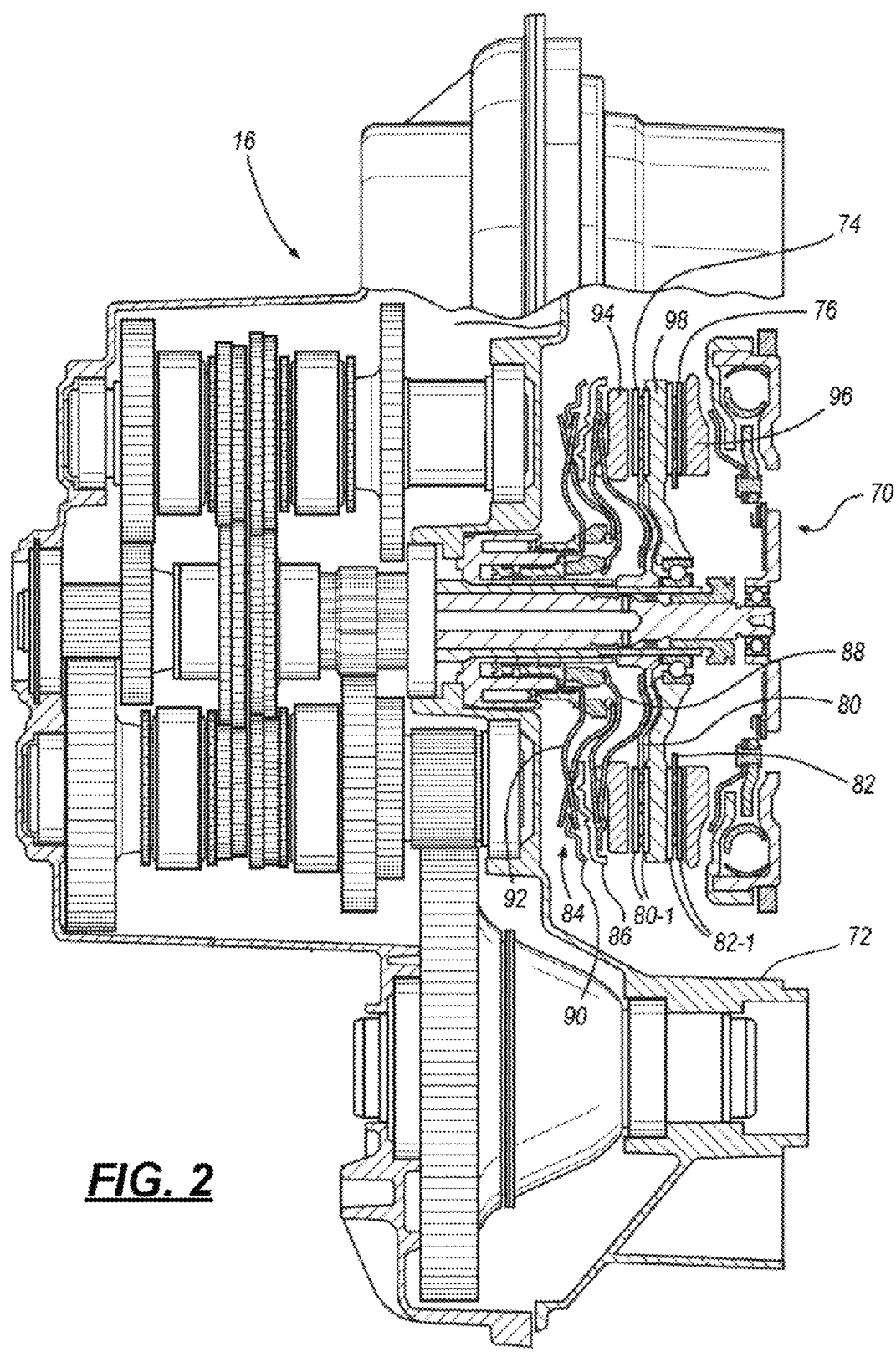
FIG. 2 is a schematic partially cross-sectional view of a dual clutch transmission.

FIG. 2 illustrates a schematic cross-sectional view of the transmission 16 provided in FIG. 1. As shown, the transmission 16 may be a dual-clutch transmission (DCT), and may include a clutch subsystem 70 located inside a clutch housing 72, and includes dry clutches 74 and 76. As shown, the clutch 74 is an even-ratio clutch, and the clutch 76 is an odd-ratio clutch. The clutches 74, 76 are configured to select the particular drive gear ratio in the DCT 16. Specifically, the clutch 74 includes a clutch plate 80 having friction facings 80-1, while the clutch 76 includes a clutch plate 82 having friction facings 82-1. The DCT 16 also includes a clutch cover 84, which has a portion 86 employed to actuate the clutch 74 via a spring 88 and a portion 90 employed to actuate the clutch 76 via a spring 92. The clutch 74 also includes a pressure plate 94, while the clutch 76 includes a pressure plate 96.

Additionally, clutches 74 and 76 share a center plate 98, wherein each of the pressure plates 94 and 96 clamp the respective friction facings 80-1 and 82-1 against the center plate 98 through the action of the springs 88 and 92 at a preselected rate to engage the respective clutch. During normal operation of the DCT 16, when one of the clutches 74, 76 is transmitting engine torque in any particular ratio, the other of the two clutches may pre-select an appropriate synchronizer of the oncoming ratio. A valvebody may control selective engagement of the clutches 74, 76 by directing a control fluid to various solenoids (not shown) that in turn regulate flow of the control fluid to the appropriate clutch.

Figure 3:
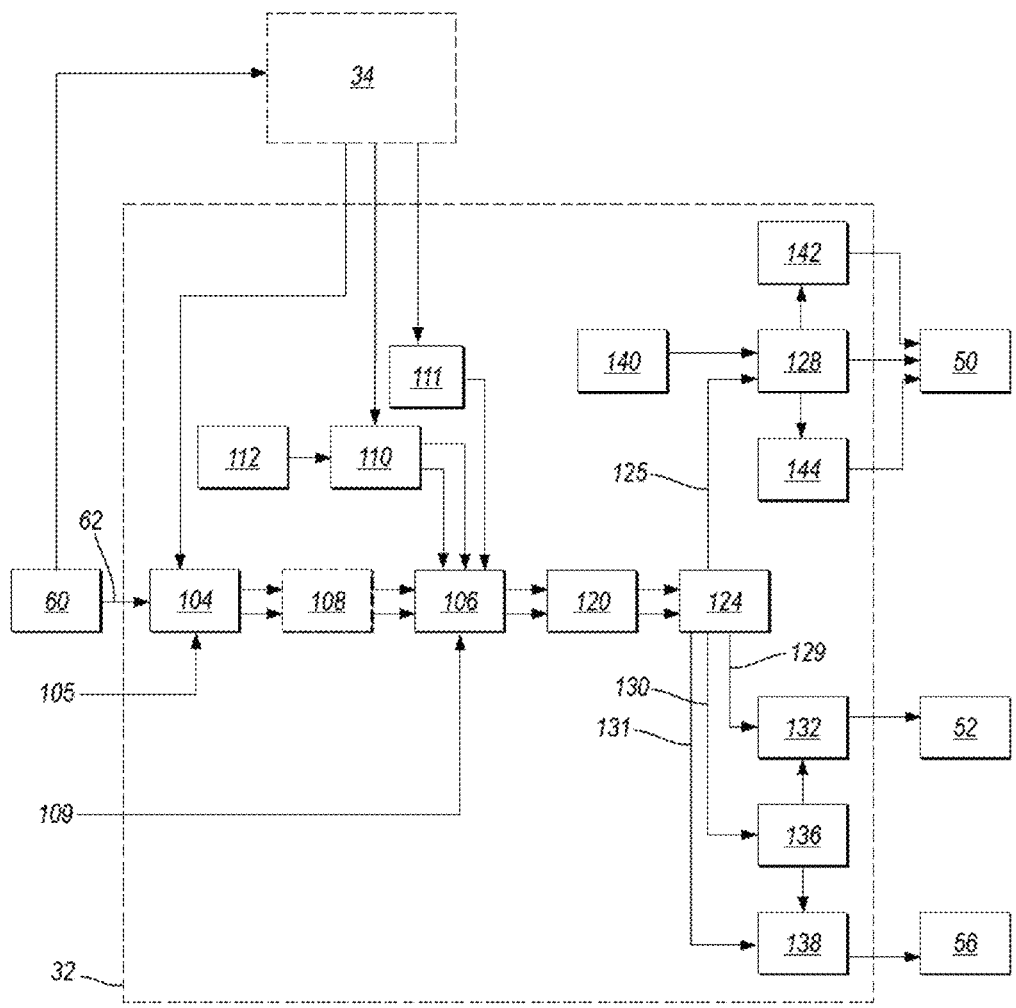
FIG. 3 is a schematic functional diagram of an embodiment of an engine control module in communication with a transmission control module.

Referring now to FIG. 3, a functional block diagram of an exemplary engine control system is presented. An exemplary implementation of an ECM 32 includes an axle torque arbitration module 104. The axle torque arbitration module 104 arbitrates between a driver input 62 from a driver input module (e.g., the accelerator device 60) and other axle torque requests 105. For example, the driver input 62 may be based on position of an accelerator pedal. The driver input 62 may also be based on cruise control, which may be an adaptive cruise control that maintains a predetermined following distance.

Torque requests may include target torque values as well as ramp requests, such as a request to ramp torque down to a minimum engine off torque or to ramp torque up from the minimum engine off torque. Axle torque requests 105 may include a torque reduction requested during wheel slip by a traction control system. Axle torque requests 105 may also include torque request increases to counteract negative wheel slip, where a tire of the vehicle slips with respect to the road surface because the axle torque is negative.

Axle torque requests 105 may also include brake management requests, vehicle over-speed torque requests, and/or low-speed vehicle creep requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests 105 may also be made by body stability control systems. Axle torque requests may further include engine cutoff requests, such as may be generated when a critical fault is detected.

The axle torque arbitration module 104 outputs a predicted torque and an immediate torque based on the results of arbitrating between the received torque requests. The predicted torque is the amount of torque that the ECM 32 prepares to generate, and may often be based on the driver's torque request. The immediate torque is the amount of currently desired torque, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold, when the traction control system senses wheel slippage.

The immediate torque may be achieved by varying engine actuators that respond quickly, while slower engine actuators may be used to prepare for the predicted torque. For example, as described above, spark advance may be adjusted quickly, while cam phaser position and airflow may be slower to respond because of mechanical lag time. Further, changes in airflow are subject to air transport delays in the intake manifold. In addition, changes in airflow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, a throttle valve can be opened, thereby increasing airflow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The axle torque arbitration module 104 outputs the predicted torque and the immediate torque to a propulsion torque arbitration module 106. In various hybrid implementations (i.e., including a motor/generator 28), the axle torque arbitration module 104 may output the predicted torque and immediate torque to a hybrid optimization module 108. The hybrid optimization module 108 determines how much torque should be produced by an engine and how much torque should be produced by a motor/generator 28. The hybrid optimization module 108 then outputs modified predicted and immediate torque values to the propulsion torque arbitration module 106.

The predicted and immediate torques received by the propulsion torque arbitration module 106 may be converted from an axle torque domain (torque at the wheels) into a propulsion torque domain (torque at the crankshaft). This conversion may occur before, after, as part of, or in place of the hybrid optimization module 108.

The propulsion torque arbitration module 106 may arbitrate between propulsion torque requests, including the converted predicted and immediate torques. The propulsion torque arbitration module 106 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests 109 may include torque reductions for engine over-speed protection, torque increases for stall prevention, and torque reductions requested by the TCM 34 to accommodate gear shifts. Propulsion torque requests 109 may also result from clutch fuel cutoff, which may reduce the engine torque output when the driver depresses the clutch pedal in a manual transmission vehicle.

Propulsion torque requests 109 may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine without regard to torque. The propulsion torque arbitration module 106 may still receive these shutoff requests so that, for example, appropriate data can be fed back to other torque requestors. For example, all other torque requestors may be informed that they have lost arbitration.

An RPM control module 110, also referred to as a vehicle idle module 110, may also output predicted and immediate torque requests to the propulsion torque arbitration module 106. The torque requests from the RPM control module 110 may prevail in arbitration when the ECM 32 is in RPM mode. RPM mode may be selected when the driver removes their foot from the accelerator pedal, such as when the vehicle is idling or coasting down from a higher speed. Alternatively or additionally, RPM mode may be selected when the predicted torque requested by the axle torque arbitration module 104 is less than a calibratable torque value.

The RPM control module 110 may receive a desired RPM from an RPM trajectory module 112, and may control the predicted and immediate torque requests to reduce the difference between the desired RPM and the actual RPM. For example only, the RPM trajectory module 112 may output a linearly decreasing desired RPM for vehicle coastdown until engine RPM reaches an idle RPM. The RPM trajectory module 112 may then continue outputting the idle RPM as the desired RPM. Alternatively, the RPM control module 110 may operate at the direction of the TCM 34 when in low speed conditions. In addition to the RPM control module, the ECM 32 may include a speed-control module 111 that may receive a speed command from the TCM 34, and operate in a closed loop manner to control the engine output speed to match that of the request when in a non-idle scenario.

A reserves/loads module 120 may receive the arbitrated predicted and immediate torque requests from the propulsion torque arbitration module 106. Various engine operating conditions may affect the engine torque output. In response to these conditions, the reserves/loads module 120 may create a torque reserve by increasing the predicted torque request.

For example only, a catalyst light-off process or a cold start emissions reduction process may directly vary spark advance for an engine. The reserves/loads module 120 may therefore increase the predicted torque request to counteract the effect of that spark advance on the engine torque output. In another example, the air/fuel ratio of the engine and/or the mass airflow may be directly varied, such as by diagnostic intrusive equivalence ratio testing and/or new engine purging. Corresponding predicted torque increases may be made to offset changes in the engine torque output during these processes.

The reserves/loads module 120 may also create a reserve in anticipation of a future load, such as the engagement of the air conditioning compressor clutch or power steering pump operation. The reserve for A/C clutch engagement may be created when the driver first requests air conditioning. Then, when the A/C clutch engages, the reserves/loads module 120 may add the expected load of the A/C clutch to the immediate torque request.

An actuation module 124 receives the predicted and immediate torque requests as output by the reserves/loads module 120. The actuation module 124 may determine how the predicted and immediate torque requests will be achieved. The actuation module 124 may be engine type specific, with different control schemes for gas engines versus diesel engines. In various implementations, the actuation module 124 may define the boundary between modules prior to the actuation module 124, which are engine independent, and modules that are engine dependent.

For example, in a gas engine, the actuation module 124 may vary the opening of the throttle 40, which allows for a wide range of torque control. However, opening and closing the throttle 40 may result in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 124 may generate an air torque request 125 based on the predicted torque request. The air torque request may be equal to the predicted torque request, causing airflow to be set so that the predicted torque request can be achieved simply by changes to other actuators.

An air control module 128 may determine desired actuator values for slow actuators based on the air torque request. For example, the air control module 128 may control desired manifold absolute pressure (MAP), desired throttle area, and/or desired air per cylinder (APC). Desired MAP may be used to determine desired boost, and desired APC may be used to determine desired cam phaser positons.

In gasoline systems, the actuation module 124 may also generate a spark torque request 129, a cylinder shut-off torque request 130, and a fuel mass torque request 131. The spark torque request may be used by a spark control module 132 to determine how much to retard the spark (which reduces the engine torque output) from a calibrated spark advance. The spark control module 132 controls the spark actuator module 52. In diesel systems, fuel mass may be the primary actuator for controlling engine torque output.

The cylinder shut-off torque request may be used by a cylinder control module 136 to determine how many cylinders to deactivate. The cylinder control module 136 may instruct a fuel control module 138 to stop providing fuel for deactivated cylinders and may instruct the spark control module 132 to stop providing spark for deactivated cylinders.

The fuel mass torque request 131 may be used by the fuel control module 138 to vary the amount of fuel provided to each cylinder 46. For example only, the fuel control module 138 may determine a fuel mass that, when combined with the current amount of air per cylinder 46, yields stoichiometric combustion. The fuel control module 138 may instruct the fuel actuator module 56 to inject this fuel mass for each activated cylinder 46. During normal engine operation, the fuel control module 138 may attempt to maintain a stoichiometric air/fuel ratio.

The fuel control module 138 may increase the fuel mass above the stoichiometric value to increase engine torque output and may decrease the fuel mass to decrease engine torque output. In various implementations, the fuel control module 138 may receive a desired air/fuel ratio that differs from stoichiometry. The fuel control module 138 may then determine a fuel mass for each cylinder 46 that achieves the desired air/fuel ratio.

A torque estimation module 140 may estimate torque output of the engine. This estimated torque may be used by the air control module 128 to perform closed-loop control of engine airflow parameters, such as MAP, throttle area, and phaser positions. For example only, a torque relationship such as may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 140 may determine APC based on measured mass air flow (MAF) and current RPM, thereby allowing closed loop air control based on actual airflow. The intake and exhaust cam phaser positions used may be based on actual positions, as the phasers may be traveling toward desired positions. In addition, a calibrated spark advance value may be used. This estimated torque may be referred to as an air torque—i.e., an estimate of how much torque could be generated at the current airflow, regardless of the actual engine torque output, which varies based on spark advance.

The air control module 128 may generate a desired manifold absolute pressure (MAP) signal, which is output to a boost scheduling module 142. The boost scheduling module 142 may use the desired MAP signal to control the one or more turbochargers and/or superchargers 42.

The air control module 128 may generate a desired area signal, which is used to regulate the throttle valve 40 to produce the desired throttle area. The air control module 128 may use the estimated torque and/or the MAF signal in order to perform closed loop control. For example, the desired area signal may be controlled based on a comparison of the estimated torque and the air torque request.

The air control module 128 may also generate a desired air per cylinder (APC) signal, which is output to a phaser scheduling module 144. Based on the desired APC signal and the RPM signal, the phaser scheduling module 144 may control positions of the intake and/or exhaust cam phasers 44.

Referring again to FIG. 2, as discussed, during normal operation, the DCT 16 may perform gear shifts using what is called an asynchronous shift. During an asynchronous shift, the DCT 16 will start to apply a clutch for the next gear (i.e., the oncoming clutch) while the clutch for the current gear (i.e., the offgoing clutch) is still holding some torque transmitting capacity though being ramped off. This is done so that torque can be communicated from the engine to the axles throughout the shift. An asynchronous shift minimizes the perception of loss of acceleration (i.e., a sag) during a shift. Due to the varying gear ratios of the different transmission gears, however, the transmission input speed cannot be simultaneously at the speed needed for both the current and next gear, hence the name "asynchronous."

In certain scenarios, however, an asynchronous shift cannot be performed. For example, if the driver engages the accelerator device 60 rather aggressively, a down-shift of multiple gears may be required. In this event, the TCM 34 has the option of shifting to one or more intermediate gears in an asynchronous manner, before arriving at the final target gear. This, however, can take an undesirable amount of time. Another option may be to release the engine 14 from the transmission 16 by opening the input clutch, while then preparing the gearbox for the desired gear. This may take less time, but could result in a momentary loss of acceleration. Such a gear-shift may be referred to as a "synchronous" shift because the speed of the engine would be controlled to match the speed of the transmission input shaft for the desired gear. A synchronous shift may likewise be required if the driver were to manually tap through a plurality of gears, such as using an electronic gear selector (commonly referred to as "paddle shifters").

Figure 4:
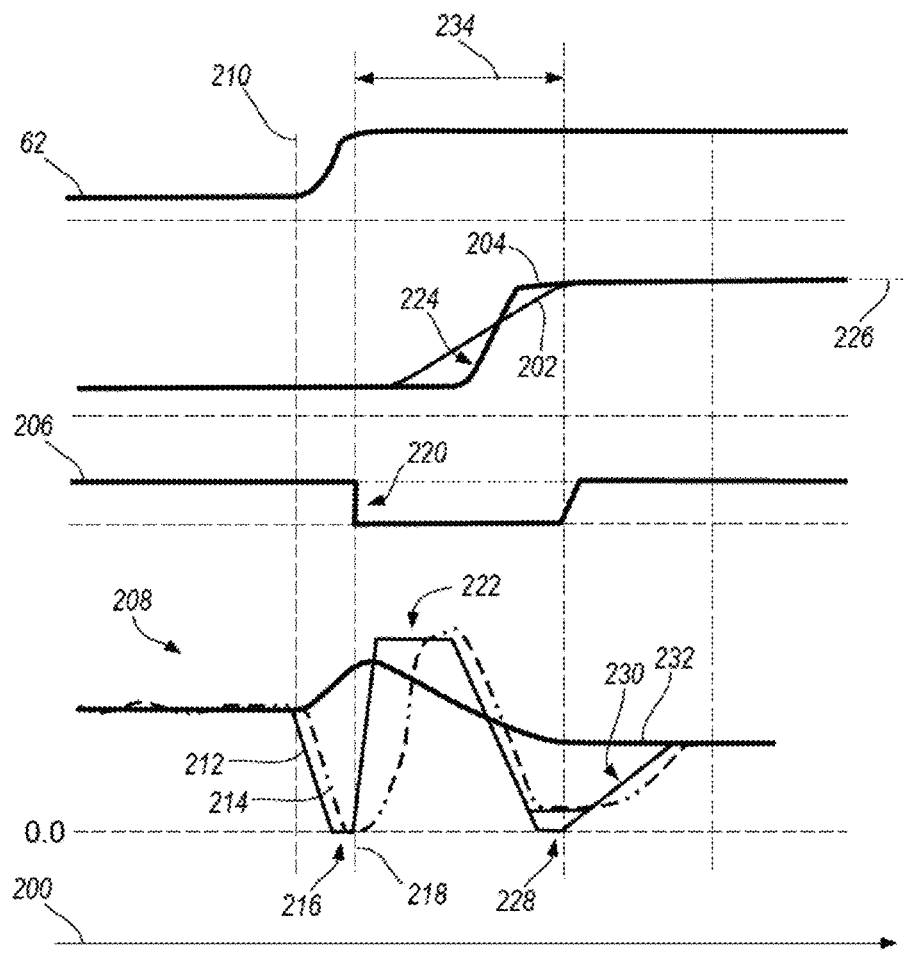
FIG. 4 is a schematic graph of a synchronous transmission shift in a dual clutch transmission that is initiated by a transmission control module following a large acceleration request.
Figure 5:
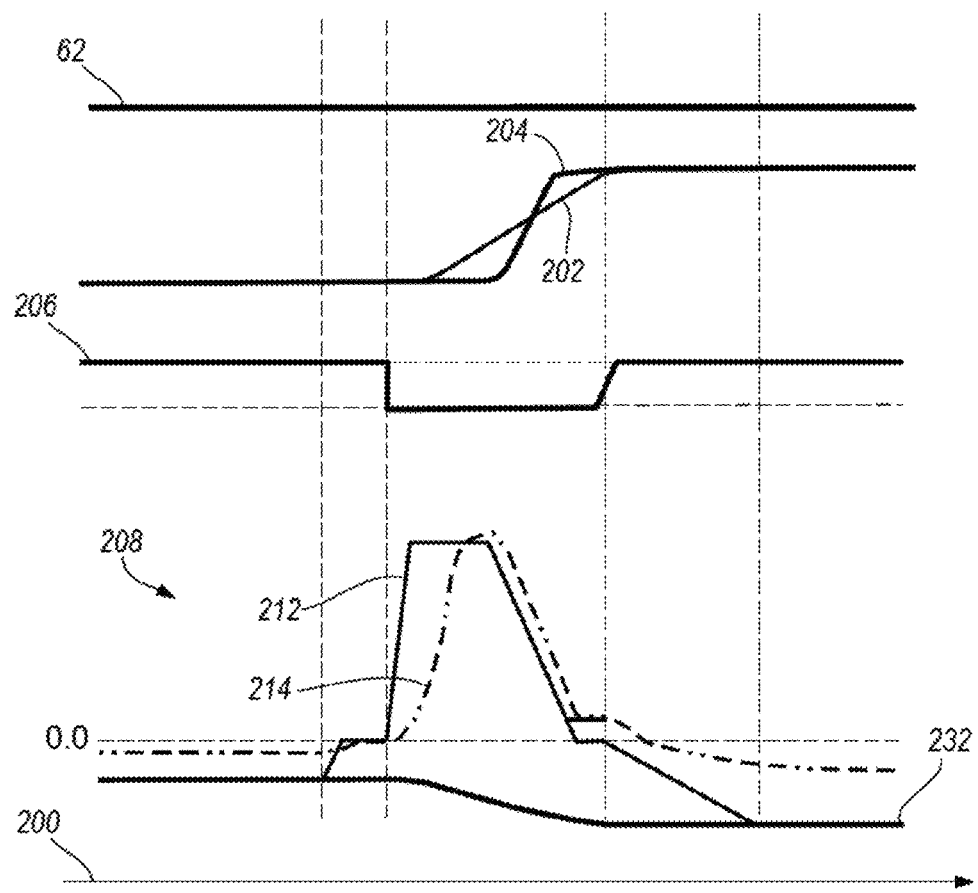
FIG. 5 is a schematic graph of a synchronous transmission shift to a lower gear in a dual clutch transmission, where the shift is initiated by a driver through an electronically controlled manual shift selector.
Figure 6:
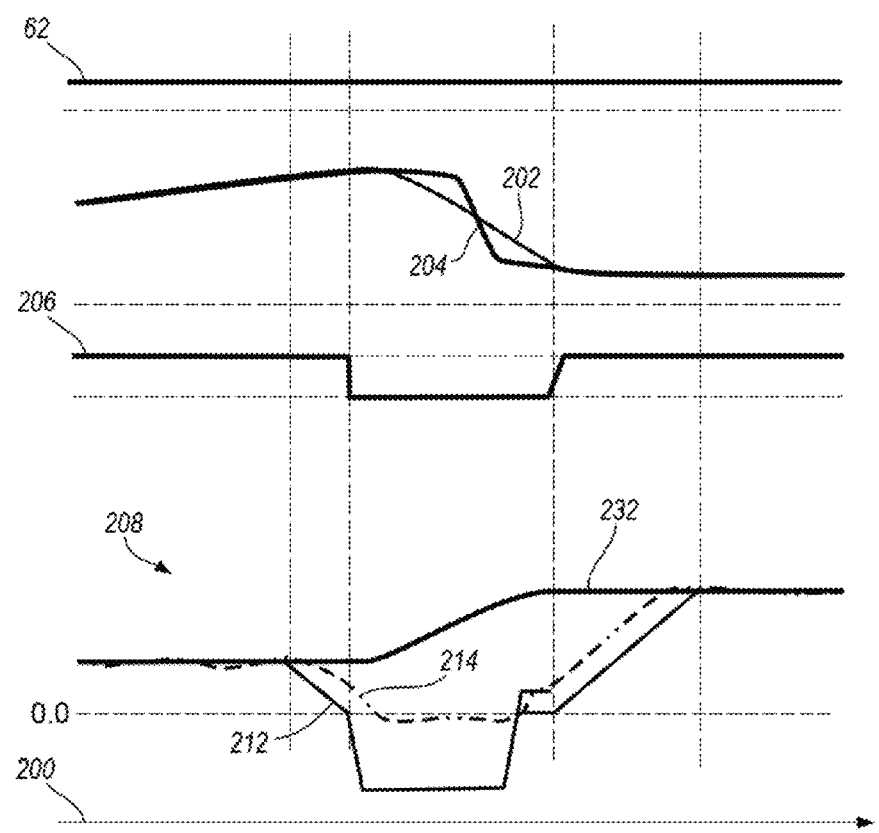
FIG. 6 is a schematic graph of a synchronous transmission shift to a higher gear in a dual clutch transmission, where the shift is initiated by a driver through an electronically controlled manual shift selector.

FIGS. 4-6 schematically illustrate three types of synchronous shifts. As shown, FIG. 4 represents a synchronous shift that is initiated by the TCM 34 when the driver engages the accelerator device 60 in an aggressive manner. FIG. 5 represents a synchronous shift that is initiated when the driver manually taps downward through a plurality of gears; and FIG. 6 represents a synchronous shift that is initiated when the driver manually taps upward through a plurality of gears. It should be recognized that other potential scenarios may be possible.

FIG. 4 illustrates a plurality of graphs that are all coordinated in time 200. From top to bottom, the graphs represent: the driver-requested axle torque signal 62 (i.e., from an accelerator pedal 60); engine speed/angular velocity 202 and transmission input shaft angular velocity 204; input clutch engagement pressure 206 (i.e., torque carrying capacity); and engine torque (generally at 208).

As shown, a driver may engage the accelerator device 60 at a first time 210. Within a short period of time after the initial onset, the TCM 34 may recognize that a multiple-gear shift is required. Such a decision may be based on the degree or slope of the engagement of the torque signal 62. In anticipation of a clutch disengagement, the TCM 34 may send a decreasing torque request 212 to the axle torque arbitration module 104 to rapidly decrease the torque output of the engine 12. Once the predicted engine output torque 214 approaches a predefined value to minimize disturbance when the input clutch is opened (generally at 216), the TCM 34 may disengage the input clutch of the transmission 16 (i.e. at time 218), as evidenced by the clutch engagement state 206 at 220. The predefined value may be a value that is lower than the previously applied torque. This lower value may provide a more gradual change in acceleration instead of a jerk as if the clutch were suddenly released.

Following the disengagement of the clutch at time 218, the TCM 34 may command a speed-control mode to the ECM 32 via the speed-control module 111. In speed control mode, the engine speed 202 is ramped to a higher level under the speed control of the ECM 32 to match with the lower gear. During this phase, the ECM 32 may increase the torque up to a saturated maximum (generally at 222). In response to the speed-control request from the TCM 34, the ECM 32 may increase the predicted generated torque 214, though on a slight time delay. A gear change within the transmission 16 may occur while the engine is increasing in speed, in FIG. 4, the gear change is evidenced by the increase in transmission input shaft angular velocity 204, generally at 224).

As the engine speed 202 approaches the desired output speed 226, the torque required may decrease back toward a lower value (generally at 228). At this time, the ECM's speed controller may make an immediate request along with the predicted request to establish a torque reserve. This request provides the speed controller with the ability to increase torque quickly to control the speed target tightly. Once the engine speed approaches the target it may then control overshoot and undershoot tightly using the torque reserve provided by the immediate actuators.

While in the speed-control mode between time 218 and time 228, the ECM 32 may disregard any torque requests provided by the TCM 34 (such as requests flowing through the axle torque arbitration module 104). Prior to 228 the TCM 34 will make a torque request that is equal to the ECM's estimated torque for an initialization point on exit of the speed control mode. Once the clutch is re-engaged, the transmission controls will disable the speed control mode and use this pending torque request to drive the ECM 32. The TCM's torque decrease request 212 may be increased (less decrease from driver), and gradually handed back to the driver control (generally at 230). FIG. 4 further illustrates the ideal steady state torque profile 232, that, together with the engine speed 202, would produce no noticeable force sags/swells to the driver. Such a profile, however, may be unattainable, due to the need for low or zero output torque during the shift. Despite this, it may serve as the baseline the TCM 34 achieves before and after the shift.

Throughout the time period where the clutch is disengaged, (i.e., time period 234), the ECM 32 shall be in a speed-controlled mode, where it attempts to ramp the engine speed to a new target value as quick as possible while not exceeding certain predetermined limits.

FIGS. 5 and 6 illustrate the corresponding graphs for a manual tap downward through the gears (FIG. 5) and for a manual tap upward through the gears (FIG. 6).

As evident from FIGS. 4-6 and the above discussion, the TCM 34 should control the input clutch load to 0 Nm (open clutch) while the speed request is active (i.e., when the engine is ramping up or down to match the speed of the new gear). Therefore, the TCM 34 may need to ramp from the steady state torque 232 to a desired value prior to enabling the speed control request to the ECM 32. At the end of the speed control event (i.e., ramp up or ramp down), the engine torque produced will typically be near 0 Nm because there is no load from the transmission 16 on the engine 14 and the engine speed 202 is done accelerating to the target value. However, the driver request (or result of arbitration with non-transmission intervention requestors) will typically drive the desired torque (e.g., the desired steady state torque 232) to be different than the speed controlled torque. Therefore, the TCM 34 shall provide ramping from the torque resulting from the speed control mode back to the desired steady state torque 232.

In the event a synchronous shift is unavailable, the TCM 34 may revert to a mode where asynchronous shifts are performed to cycle through the various gears until the desired gear is reached.

From the ECM's point of view, when the TCM 34 requests a synchronous shift, the ECM 32 will be directed into a speed control mode at the speed-control module 111. A minimum RPM limit may be set to ensure that the engine speed 202 does not drop below the engine idle speed. In one configuration, the engine speed may be held above the engine idle speed by a particular offset. If an engine speed request from the TCM 34 would cause the engine speed to overshoot past the offset and approach the idle speed, the ECM 32 may artificially retard the response to the request to minimize any such overshoot. Likewise, the RPM may be max-limited to prevent any excessive engine speeds that may cause damage to engine component hardware.

As such, the TCM 34 may be configured to open the input clutch to the transmission, enable the speed-control mode within the ECM 32, and send a desired engine speed request to the ECM 32 such that the engine speed matches the input clutch speed at the target gear.

The ECM 32 may contain an engine RPM control module 110, which may be different from the idle speed control system used to control the system minimum limits and zero pedal torque. Using two control modules may be beneficial so that the driver request system can generate a request as if the shift was not in progress, and torque intervention requestors can communicate their desired axle torque through the non-trans regulated torque to the TCM 34.

Prior to the speed matching request, the TCM 34 may make a torque request to the ECM 32 so that it blends the torque to a more neutral point that may optimize axle torque feel as the clutch opens. During the speed matching request, the TCM 34 makes a torque request equal to the ECM's reported engine torque and then when it transitions from the speed matching request it blends that torque toward the non-transmission regulated steady state torque. The ECM 32 may ignore the TCM's torque requests during the speed matching operation in order to be able to perform the switch at the end of the event.

The ECM 32 may apply a directional limit to intervening speed controller's torque that may be requested. Likewise, when above a target torque amount, the TCM 34 may apply a maximum torque limiter.

The TCM 34 may include an abort system when the engine speed doesn't converge to the target in an appropriate amount of time and controls the torque to the driver with its torque request and applies the input clutch slower.

Figure 7:
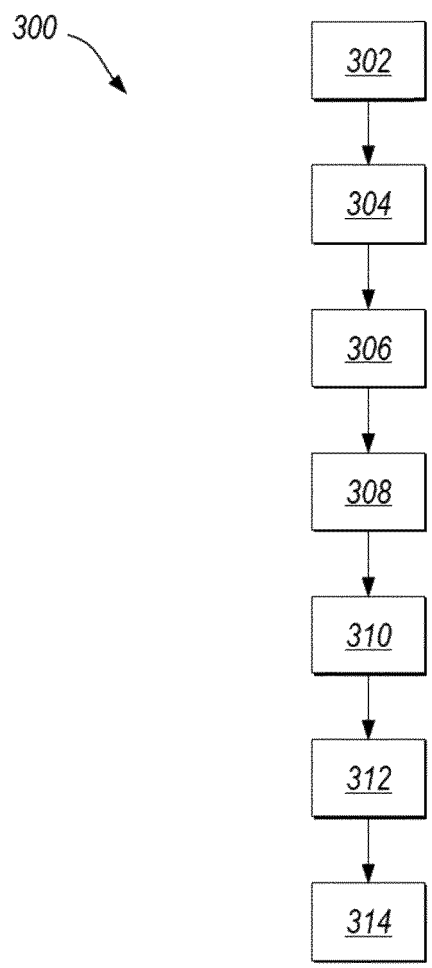
FIG. 7 is a schematic diagram of a method of commanding a synchronous gear shift in a vehicle powertrain that includes an engine and a transmission.

In the manner described above, FIG. 7 illustrates a method 300 of commanding a synchronous gear shift in a vehicle powertrain. As shown, the method 300 begins upon receiving a request to shift from a third gear to a first gear (step 302) As may be appreciated, the terms "third" and "first" are used as generic, numeric identifiers that may refer to any two gears within the powertrain that are separated by at least one intermediate gear that has a gear ratio between that of the first and third gears. Following the request at step 302, the TCM 34 may reduce a commanded torque to a predetermined value in preparation for a shift (step 304). The TCM 34 may open a clutch disposed on the input shaft of the transmission 16 to decouple the transmission 16 from the engine 12 (at step 306). The TCM 34 may then transition the engine 12 from a torque-control mode into a speed-control mode by indicating as such to the speed-control module 111 of the ECM 32 (step 308). The TCM 34 may command the engine 12 to rotate at a speed dictated by the motion of the vehicle and the gear ratio of the first gear such that the speed of the engine would then match the speed of the input shaft of the transmission 16 while in the first gear (step 310). The TCM 34 may then close the clutch to couple the transmission 16 with the engine 12 (step 312). Finally, the TCM 34 may transition the engine 12 back into the torque-control mode (step 314), and may gradually pass the torque intervention back to the driver's requested pedal torque.

While the presently disclosed techniques and methodologies are generally described with reference to a Dual Clutch Transmission, they are equally applicable, and can be used with a Manual Transmission (MTA), or any other similarly configured transmission that may rely on synchronous speed-matching gear shifts.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of commanding a synchronous gear shift in a vehicle powertrain that includes an engine and a transmission having a plurality of ordered gears, the method comprising:

receiving a request to shift from a third gear to a first gear, and skipping a second gear having a gear ratio between the gear ratio of the first gear and the gear ratio of the third gear;

reducing a torque command to a predetermined value;

opening a clutch disposed on an input shaft of the transmission to decouple the transmission from the engine;

transitioning the engine from a torque-control mode into a speed-control mode;

commanding the engine, while in the speed-control mode, to rotate at a speed dictated by the motion of the vehicle and the gear ratio of the first gear;

closing the clutch to couple the transmission and the engine; and transitioning the engine back into the torque-control mode.

2. The method of claim 1, wherein the engine operates in response to a driver torque request while in the torque-control mode; and wherein closing the clutch to couple the transmission and the engine includes closing the clutch over a period of time such that a torque of the input shaft of the transmission is blended to match the driver torque request.

3. The method of claim 2, further comprising receiving the driver torque request continuously throughout the synchronous gear shift.

4. The method of claim 3, further comprising arbitrating between the driver torque request and a transmission input shaft speed request.

5. The method of claim 1, wherein the torque command saturates at an immediate torque maximum during the speed-control mode, and wherein the immediate torque maximum includes a maximum amount of torque capable of being produced by the engine at a fixed airflow.

6. The method of claim 1, wherein the torque command approaches zero prior to the closing of the clutch to couple the transmission and the engine.

7. The method of claim 1, wherein the torque command and the engine rotation speed are independently controllable through the adjustment of a spark timing, a fuel supply, and an airflow supply.

8. The method of claim 1, further comprising disregarding an axle torque request while in the speed-control mode.

9. The method of claim 1, wherein transitioning the engine back into the torque-control mode includes gradually transitioning the engine back into the torque-control mode over a period of time.

10. The method of claim 1, wherein the torque command is a function of a driver acceleration request when the engine is in the torque-control mode.

11. A method of commanding a synchronous gear shift in a vehicle powertrain that includes an engine and a transmission having a plurality of ordered gears, the method comprising:

receiving a request to shift from a third gear to a first gear, and skipping a second gear having a gear ratio between the gear ratio of the first gear and the gear ratio of the third gear;

reducing a torque command to approximately zero via an immediate torque request;

opening a clutch disposed on an input shaft of the transmission to decouple the transmission from the engine;

transitioning the engine from a torque-control mode into a speed-control mode;

disregarding an axle torque request while in the speed-control mode.

commanding the engine, while in the speed-control mode, to rotate at a speed dictated by the motion of the vehicle and the gear ratio of the first gear;

closing the clutch to couple the transmission and the engine; and transitioning the engine back into the torque-control mode.

12. The method of claim 11, wherein an immediate torque request effectuates a modification to at least one of a spark timing and an amount of fuel supplied to a cylinder.

13. The method of claim 11, wherein the torque command saturates at an immediate torque maximum during the speed-control mode, and wherein the immediate torque maximum includes a maximum amount of torque capable of being produced by the engine at a fixed airflow.

14. The method of claim 11, wherein the torque command approaches zero prior to the closing of the clutch to couple the transmission and the engine.

15. The method of claim 11, wherein the torque command and the engine rotation speed are independently controllable through the adjustment of a spark timing, a fuel supply, and an airflow supply.

16. The method of claim 11, wherein transitioning the engine back into the torque-control mode includes gradually transitioning the engine back into the torque-control mode over a period of time.

17. The method of claim 11, wherein the torque command is a function of a driver acceleration request when the engine is in the torque-control mode.

* * * * *